United States Patent

Kondo et al.

[11] Patent Number: 6,086,663
[45] Date of Patent: Jul. 11, 2000

[54] SURFACE MODIFIER COMPOSITION

[75] Inventors: Hidetoshi Kondo; Masahiro Takahashi, both of Chiba Prefecture, Japan

[73] Assignee: Dow Corning Toray Silicone Co., Ltd., Tokyo, Japan

[21] Appl. No.: 09/063,698

[22] Filed: Apr. 21, 1998

[30] Foreign Application Priority Data

Apr. 21, 1997 [JP] Japan ................................. 9-117574

[51] Int. Cl.⁷ .................................................. C09K 3/00
[52] U.S. Cl. .................. 106/287.11; 528/26; 556/419; 556/420; 424/401; 424/70.122; 252/182.29
[58] Field of Search .................................. 556/419, 420; 528/26; 424/401, 70.122; 252/182.29; 106/287.11

[56] References Cited

U.S. PATENT DOCUMENTS

| | | | |
|---|---|---|---|
| 3,565,845 | 2/1971 | Johnson | 260/29.2 |
| 3,652,629 | 3/1972 | Fort | 260/448.2 N |
| 3,657,305 | 4/1972 | Morehouse | 260/448.2 B |
| 3,658,864 | 4/1972 | Golitz et al. | 260/448.2 N |
| 4,973,620 | 11/1990 | Ona et al. | 524/292 |
| 5,015,469 | 5/1991 | Yoneyama et al. | 424/59 |
| 5,147,578 | 9/1992 | Kirk | 252/358 |
| 5,310,783 | 5/1994 | Bernheim et al. | 524/837 |
| 5,539,136 | 7/1996 | Raleigh et al. | 556/420 |
| 5,612,409 | 3/1997 | Chrobaczek et al. | 524/838 |

*Primary Examiner*—Margaret G. Moore
*Attorney, Agent, or Firm*—Jim L. DeCesare

[57] ABSTRACT

A surface modifier composition that exercises an excellent antistatic performance, offers an excellent storage stability, and provides an excellent surface feel, surface protection, and surface lubricity; that does not suffer from deterioration over long periods of time; that exhibits an excellent blending stability with respect to cosmetics, lubricants, lustrants, antifoams, fiber-treatment agents, and paints; and that has an excellent capacity to improve a variety of surface properties. The surface modifier composition comprises an (A) amidepolyether-modified organopolysiloxane and an (B) alcoholic functional group-containing compound.

1 Claim, No Drawings

SURFACE MODIFIER COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to surface modifier compositions. More particularly, this invention relates to a surface modifier composition whose base ingredient is an amidepolyether-modified organopolysiloxane that exhibits an excellent blending stability with respect to cosmetics, lubricants, lustrants, antifoams, fiber-treatment agents, and paints, and that can provide an excellent use sensation, surface protection, transparency in blending, antistatic properties, and surface lubricity.

BACKGROUND OF THE INVENTION

Dimethylpolysiloxane is the most generic organopolysiloxane, but other known organopolysiloxanes include the methylphenylpolysiloxanes, methylhydrogenpolysiloxanes, octamethylcyclotetrasiloxane, dimethylpolysiloxane-polyethylene glycol copolymers, and dimethylpolysiloxane-polypropylene glycol copolymers. Also known are variously modified organopolysiloxanes, for example, methylstyrene-modified organopolysiloxanes, olefin-modified organopolysiloxanes, polyether-modified organopolysiloxanes, alcohol-modified organopolysiloxanes, fluorine-modified organopolysiloxanes, amino-modified organopolysiloxanes, mercapto-modified organopolysiloxanes, epoxy-modified organopolysiloxanes, carboxyl-modified organopolysiloxanes, and higher aliphatic acid-modified organopolysiloxanes. The listed organopolysiloxanes are used in a large number of fields. For example, an oil component has heretofore been blended into cosmetics in order to prevent skin drying and protect the surface of the hair, but dimethylpolysiloxanes have recently entered into wide use in this application due to desire for a light use sensation.

Unfortunately, a drawback to the dimethylpolysiloxanes is their unsatisfactory miscibility with water and other oily ingredients, which has made it difficult to blend them into cosmetics and has had a pronounced tendency to result in an impaired stability. In addition, the dimethylpolysiloxanes also suffer from problems with their use sensation, such as a peculiar oily feel, the absence of a moistening sensation, and a strong raspy sensation. Another problem with the dimethylpolysiloxanes is that they readily migrate or transfer from the hair and skin surface.

In response to these problems, Japanese Patent Application Laid Open (Kokai or Unexamined) Number Sho 55-136214 (136,214/1980) has proposed a hair conditioner composition that contains a polyoxyalkylene-functional polysiloxane, while Japanese Patent Application Laid Open (Kokai or Unexamined) Number Sho 56-45406 (45,406/1981) has proposed a hair conditioner composition that contains an (aminoalkyl)methylpolysiloxane. The former composition, however, has a poor retention, while the latter composition provides a sticky sensation and hence an unacceptable use sensation. In distinction to the modified organopolysiloxanes mentioned above, Japanese Patent Application Laid Open (Kokai or Unexamined) Number Hei 1-306682 (306,682/1989) (U.S. Pat. No. 4,973,620) teaches the use as a fiber-treatment agent of a composition comprising a toluene solution of an amino-functional organopolysiloxane and a polyoxyethylene aliphatic acid which are precursors to polyamide-modified organopolysiloxanes. The use of emulsions prepared from an aliphatic acid amide-modified organopolysiloxane, a surfactant, and water, as laundry detergents has also been disclosed. However, the amide-modified polysiloxanes, like the dimethylpolysiloxanes, have been highly hydrophobic and have had a poor blend stability when blended by known methods. During long-term storage they have had a pronounced tendency to deteriorate, undergoing such phenomena as separation, and aggregation. As a result, the use of amide-modified organopolysiloxanes as surface modifiers has remained unrealized and unknown.

BRIEF SUMMARY OF THE INVENTION

The object of the present invention is to provide a surface modifier composition that exercises an excellent antistatic performance, offers an excellent storage stability, and provides an excellent surface feel, surface protection, and surface lubricity; that does not deteriorate over long periods of time; that in particular exhibits an excellent blending stability with respect to cosmetics, lubricants, lustrants, antifoams, fiber-treatment agents, and paints; and that can provide such surface-modifying and surface-improving effects as an excellent use sensation, transparency in blending, surface protection, antistatic performance, and surface lubricity.

These and other objects of the invention will become apparent from a consideration of the following detailed description.

BRIEF DESCRIPTION OF THE SEVERAL VIEWS OF THE DRAWINGS

Not applicable.

DETAILED DESCRIPTION OF THE INVENTION

The present invention is achieved by a surface modifier composition comprising an (A) amidepolyether-modified organopolysiloxane with the average component formula (1)

$$R^1_a R^2_b Q^1_c Q^2_d SiO_{(4-a-b-c-d)/2} \qquad (1)$$

in which a and d are each zero or a positive number and b and c are each positive numbers with the proviso that the sum of a+b+c+d is 1.9 to 2.2 inclusive, $R^1$ is the hydrogen atom, hydroxyl group, or a substituted or unsubstituted monovalent hydrocarbon group having from 1 to 8 carbon atoms; $R^2$ represents monovalent hydrocarbon groups having from 1 to 6 carbon atoms; $Q^1$ represents a group with formula (2) or formula (3)

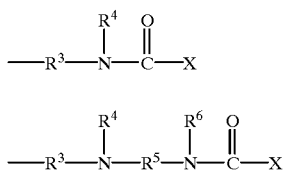

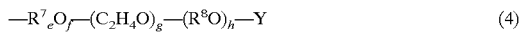

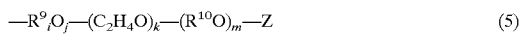

in which $R^3$ and $R^5$ each represent divalent hydrocarbon groups having from 2 to 18 carbons atoms, $R^4$ and $R^6$ each represent the hydrogen atom or a monovalent hydrocarbon group having from 1 to 8 carbon atoms, and X represents a group with formula (4)

$$-R^7{}_eO_f-(C_2H_4O)_g-(R^8O)_h-Y \qquad (4)$$

in which e and f are each 0 or 1; g and h are each 0 or a positive integer with a value of at least 1; $R^7$ represents divalent hydrocarbon groups having from 2 to 18 carbon atoms; $R^8$ represents divalent hydrocarbon groups having from 3 to 10 carbons atoms; and Y is the hydrogen atom, monovalent hydrocarbon groups having from 1 to 18 carbon atoms, acyl groups, or isocyanate groups; and $Q^2$ represents a group with formula (5)

$$-R^9{}_iO_j-(C_2H_4O)_k-(R^{10}O)_m-Z \qquad (5)$$

in which i and j are each 0 or 1; k is a positive integer with a value of at least 1; m is 0 or a positive integer with a value of at least 1; $R^9$ represents divalent hydrocarbon groups having from 2 to 18 carbon atoms; $R^{10}$ represents divalent hydrocarbon groups having from 3 to 10 carbon atoms; and Z is the hydrogen atom, monovalent hydrocarbon groups having from 1 to 18 carbons groups, acyl groups, or isocyanate groups; with the proviso that d and g do not both have a value of 0; and (B) an alcoholic functional group-containing compound which is used as a stabilizer.

The organopolysiloxane (A) which has the average component formula (1) is an organopolysiloxane that carries both amide and polyoxyethylene groups. $R^1$ in formula (1) is the hydrogen atom, the hydroxyl group, or a monovalent hydrocarbon group having from 1 to 8 carbon atoms. The monovalent hydrocarbon groups encompassed by $R^1$ are specifically exemplified by alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. $R^2$ in formula (1) represents monovalent hydrocarbon groups having from 1 to 6 carbon atoms and is specifically exemplified by methyl, ethyl, propyl, butyl, pentyl, hexyl, vinyl, and phenyl. $Q^1$ in formula (1) designates an amide-functional divalent organic group with the formula (2) or (3) given above. $R^3$ and $R^5$ in formulas (2) and (3) represent divalent hydrocarbon groups having from 2 to 18 carbon atoms, for example, ethylene, propylene, butylene, isobutylene, pentamethylene, octamethylene, decamethylene, dodecamethylene, and cyclohexylene. $R^4$ and $R^6$ in formulas (2) and (3) can each be the hydrogen atom or a monovalent hydrocarbon group having from 1 to 8 carbon atoms. The monovalent hydrocarbon groups encompassed by $R^4$ and $R^6$ are specifically exemplified by alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. The group X in formulas (2) and (3) is a monovalent organic group with the formula (4) given above. $R^7$ in formula (4) represents divalent hydrocarbon groups having from 2 to 18 carbon atoms, for example, ethylene, propylene, butylene, isobutylene, pentamethylene, octamethylene, decamethylene, dodecamethylene, and cyclohexylene. $R^8$ in formula (4) represents divalent hydrocarbon groups having from 3 to 10 carbon atoms, for example, propylene, isopropylene, butylene, and isobutylene. The group Y in formula (4) is selected from the hydrogen atom, alkyl groups, acyl groups, and the isocyanate group and can be exemplified by methyl, ethyl, propyl, acetyl, and propionyl. $Q^2$ in formula (1) is a polyoxyalkylene-functional monovalent organic group with the formula (5) given above. $R^9$ in formula (5) is a divalent hydrocarbon group having from 2 to 18 carbon atoms, such as ethylene, propylene, butylene, isobutylene, pentamethylene, octamethylene, decamethylene, dodecamethylene, and cyclohexylene. $R^{10}$ in formula (5) is a divalent hydrocarbon group having from 3 to 10 carbon atoms, such as propylene, isopropylene, butylene, and isobutylene. Z in formula (5) is selected from the hydrogen atom, alkyl groups, acyl groups, and the isocyanate group and can be exemplified by methyl, ethyl, propyl, acetyl, and propionyl. The subscript c in compound (1) preferably is in the range from 0.001 to 1. Values of c below 0.001 result in poor retention by the skin and hair, while an acceptable smoothness and flexibility are not obtained when c has a value in excess of 1. The subscripts g and k are each preferably from 2 to 20. Values below 2 fail to give an acceptable antistatic performance, blending stability, and use sensation when the substrate is damp. Values in excess of 20 increase the water solubility and thereby cause a poor retention. In addition, the hydrophilicity of the composition according to the present invention can be varied in fine increments/decrements through adjustments in the polyethylene oxide group content. The solubility/deposition properties in a system can be freely varied by optimizing the blending stability in the particular final blended composition and/or by varying the ambient surfactant concentration under the conditions of use. The molecular structure of component (A) may be straight chain, branched, cyclic, or network.

The amide- and polyoxyethylene-functional polysiloxane as described above can be exemplified by compounds with the general formulas given below.

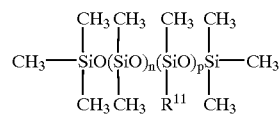

$R^{11}$ is $-(CH_2)_3NHCO(CH_2)_qO(CH_2CH_2O)_r(CH_2)_sH$, n is from 10 to 1,000, p is from 1 to 100, q is from 1 to 100, r is from 2 to 20, and s is from 0 to 20.

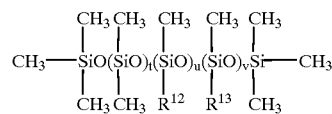

$R^{12}$ is $-(CH_2)_3NH(CH_2)_2NHCO(CH_2)_wH$, $R^{13}$ is $-(CH_2)_3(CH_2CH_2O)_x(CH_2CHCH_3O)_y(CH_2)_zH$, t is from 10 to 1,000, u is from 1 to 100, v is from 1 to 100, w is from 1 to 20, x is from 2 to 20, y is from 0 to 20, and z is from 0 to 20.

This component is specifically exemplified by compounds with the following chemical structures:

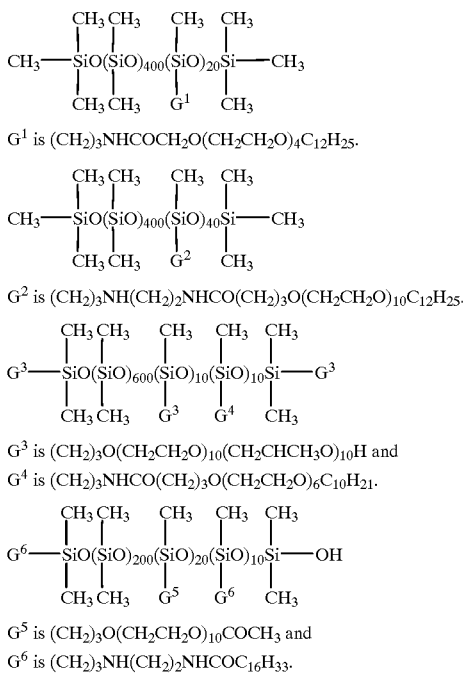

$G^1$ is $(CH_2)_3NHCOCH_2O(CH_2CH_2O)_4C_{12}H_{25}$.

$G^2$ is $(CH_2)_3NH(CH_2)_2NHCO(CH_2)_3O(CH_2CH_2O)_{10}C_{12}H_{25}$.

$G^3$ is $(CH_2)_3O(CH_2CH_2O)_{10}(CH_2CHCH_3O)_{10}H$ and
$G^4$ is $(CH_2)_3NHCO(CH_2)_3O(CH_2CH_2O)_6C_{10}H_{21}$.

$G^5$ is $(CH_2)_3O(CH_2CH_2O)_{10}COCH_3$ and
$G^6$ is $(CH_2)_3NH(CH_2)_2NHCOC_{16}H_{33}$.

The alcoholic functional group-containing compound (B) is used as a stabilizer and is exemplified by aliphatic alcohols such as ethanol, isopropyl alcohol, butyl alcohol, lauryl alcohol, myristyl alcohol, cetyl alcohol, stearyl alcohol, oleyl alcohol, behenyl alcohol, ceryl alcohol, allyl alcohol, butenol, linoleyl alcohol, linolenyl alcohol, undecenol, isostearyl alcohol, octyldodecanol, and hexyldecanol; aromatic alcohols and phenols such as phenol, cresol, butylphenol, amylphenol, octylphenol, nonylphenol, diisopropylphenol, catechol, resorcinol, hydroquinone, phenylethyl alcohol, benzyl alcohol, phenylpropyl alcohol, and naphthol; sterols such as cholesterol, phytosterol, cholestanol, campesterol, sitosterol, lathosterol, spinasterol, zymosterol, lophenol, gramisterol, citrostadienol, lanosterol, cycloartenol, and methylenecycloartanol; polyhydric alcohols such as ethylene glycol, diethylene glycol, triethylene glycol, polyethylene glycol, propylene glycol, dipropylene glycol, polypropylene glycol, glycerol, diglycerol, polyglycerol, isoprene glycol, 1,3-butylene glycol, ethylene glycol monoethyl ether, ethylene glycol monobutyl ether, batyl alcohol, chimyl alcohol, selachyl alcohol, isostearyl glyceryl ether, and pentaerythritol; saccharides such as sorbitol, mannitol, glucose, sucrose, fructose, xylitol, lactose, maltose, maltitose, and trehalose; polymer compounds such as gum arabic, arabinogalactan, carrageenan, agar, guar gum, xanthan gum, gellan gum, cellulose, lanolin alcohol, and polyvinyl alcohol; and derivatives of the preceding such as propylene glycol monostearate, glyceryl monostearate, polyoxyethylene glyceryl monooleate, decaglyceryl monolaurate, sorbitan monopalmitate, polyoxyethylene castor oil, polyoxyethylene sterol, polyethylene glycol monooleate, polyoxyethylene lauryl ether, and polyoxyethylene nonylphenyl ether. Preferred are aliphatic and polyhydric alcohols that contain at least 10 carbon atoms. Component (B) is added at from 0.01 to 1,000 weight parts, preferably from 1 to 500 weight parts, and particularly preferably from 10 to 100 weight parts, in each case per 100 weight parts of component (A).

The composition according to the present invention can be prepared simply by mixing the above-described components (A) and (B) to homogeneity. In addition to components (A) and (B), the composition can contain the various additives known for use in surface modifiers insofar as the object of the invention is not impaired. These additives are exemplified by dimethylpolysiloxanes, octamethylcyclotetrasiloxane, vaseline, and liquid paraffin. The surface modifier according to the present invention can be combined with additives to prepare a surface modifier suited for application as, for example, a cosmetic, lubricant, lustrant, antifoam, fiber-treatment agent, and paint; and can also be admixed into, for example, cosmetics, lubricants, lustrants, antifoams, fiber-treatment agents, and paints; in order to improve their surface properties. In either case, the content range for the surface modifier can be in the range from 0.1 to 99.9 weight % and is preferably in the range from 1 to 99 weight %.

The composition as described above has an excellent antistatic performance; provides an excellent surface feel, surface protection, and surface lubricity; has an excellent storage stability; and does not deteriorate over long periods of time. In addition, because it exhibits an excellent blending stability with respect to cosmetics, lubricants, antifoams, fiber-treatment agents, and paints, its admixture into these products can provide a major improvement in their capacity to modify and improve surfaces. The composition can therefore be used as an additive for improving the surface-modifying properties of, for example, cosmetics, lubricants, lustrants, antifoams, surface-treatment agents, and paints.

EXAMPLES

The invention is explained in greater detail in the following working examples. The starting compounds and evaluation methods used in the examples are described below.

(1) Starting Compounds:
  amidepolyether-modified polysiloxane

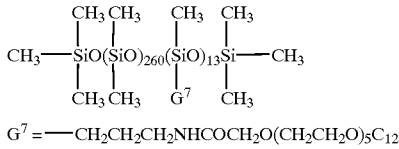

$G^7 = $ —$CH_2CH_2CH_2NHCOCH_2O(CH_2CH_2O)_5C_{12}H_{25}$ amino-modified polysiloxane

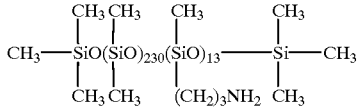

dimethylpolysiloxane

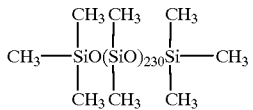

(2) Evaluation Methods:
  Storage Stability Test
  50 cc of the particular surface modifier composition was placed in a transparent glass bottle and held at 50° C. for 1 day. The condition of the composition after this holding period was visually evaluated and was scored according to the following evaluation scale.

Scale for Stability Evaluation
A: the composition was homogeneous and no changes had occurred
B: separation of a small amount of oil
C: separation of oil
D: oil particles were produced and had separated Antistaticity Test 15 g hair (length=15 cm) was tied into a bundle and the particular surface modifier composition was applied over the entire bundle. The hair bundle was then rinsed with running water for 30 seconds, after which the moisture was wiped off with a towel. The hair bundle was then dried with a dryer and rubbed 100 times with a vinyl chloride resin sheet. The condition of the hair at this point was evaluated using the following scale.

Scale for Evaluation of the Antistaticity
A: expansion of the hair was absent
B: moderate expansion of the hair
C: expansion of the hair occurred
D: the hair stood on end Use Sensation Test as a Skin Cosmetic The particular surface modifier composition was applied in a uniform manner on the inside of the forearm of each individual in a ten-person panel. The softness, smoothness, and oily feel of the skin were sensorially evaluated using the following evaluation scale.

Evaluation Scale
A: very good
B: fair
C: mediocre
D: very poor

Use Sensation Test as a Hair are Product 15 g hair (length=15 cm) was tied into a bundle and the particular surface modifier composition was applied over the entire bundle. The hair bundle was then rinsed with running water for 30 seconds, after which the moisture was wiped off with a towel. The raspiness or friction during wet combing was sensorially evaluated using the scale given below. The towel-dried hair was then dried using a dryer, after which the flexibility, smoothness, and oily feel of the hair were sensorially evaluated also using the scale given below.

Evaluation Scale
A: very good
B: fair
C: mediocre
D: very poor

Example 1

A surface modifier composition was prepared by mixing the following to homogeneity: 10 weight parts of the amidepolyether-modified polysiloxane, 10 weight parts lanolin alcohol, 40 weight parts octamethylcyclotetrasiloxane, and 40 weight parts liquid paraffin. This composition was tested for its storage stability, antistaticity, and use sensation as a skin cosmetic, and the results from these evaluations are reported in Table 1 below.

Comparative Example 1

A surface modifier composition was prepared as in Example 1, but in this example the amidepolyether-modified polysiloxane used in Example 1 was replaced with the amino-modified polysiloxane. The properties of this composition were evaluated as described in Example 1, and the results from these evaluations are reported in Table 1 below.

Comparative Example 2

A surface modifier composition was prepared as in Example 1, but in this example the amidepolyether-modified polysiloxane used in Example 1 was replaced with the dimethylpolysiloxane. The properties of this composition were evaluated as described in Example 1, and the results from these evaluations are reported in Table 1 below.

Comparative Example 3

A surface modifier composition was prepared as in Example 1, but in this example the amidepolyether-modified polysiloxane used in Example 1 was replaced with vaseline. The properties of this composition were evaluated as described in Example 1, and the results from these evaluations are reported in Table 1 below.

TABLE 1

|  | Example | Comparative Examples | | |
| --- | --- | --- | --- | --- |
|  | 1 | 1 | 2 | 3 |
| components |  |  |  |  |
| amidepolyether-modified polysiloxane | 10 |  |  |  |
| amino-modified polysiloxane |  | 10 |  |  |
| dimethylpolysiloxane |  |  | 10 |  |
| vaseline |  |  |  | 10 |
| lanolin alcohol | 10 | 10 | 10 | 10 |
| octamethylcyclotetrasiloxane | 40 | 40 | 40 | 40 |
| liquid paraffin | 40 | 40 | 40 | 40 |
| evaluation results |  |  |  |  |
| storage stability | A | A | A | D |
| antistaticity | A | B | C | C |
| softness | A | A | B | D |
| smoothness | A | B | C | D |
| oily feel | A | C | C | D |

Example 2

A surface modifier composition was prepared by mixing the following to homogeneity: 10 weight parts of the amidepolyether-modified polysiloxane, 0.5 weight part stearic acid, 1.5 weight parts cetyl alcohol, 3 weight parts vaseline, 2 weight parts lanolin alcohol, 2 weight parts polyoxyethylene glycol (10) monooleate, 3 weight parts propylene glycol, 1 weight part triethanolamine, and 77 weight parts water. This composition was tested for its storage stability, antistaticity, and use sensation as a skin cosmetic, and the results from these evaluations are reported in Table 2 below.

Comparative Example 4

A surface modifier composition was prepared as in Example 2, but in this example the amino-modified polysiloxane was used in place of the amidepolyether-modified polysiloxane in Example 2. The properties of this composition were evaluated as in Example 2, and the results from these evaluations are reported in Table 2 below.

Comparative Example 5

A surface modifier composition was prepared as in Example 2, but in this example the dimethylpolysiloxane was used in place of the amidepolyether-modified polysiloxane in Example 2. The properties of this composition were evaluated as in Example 2, and the results from these evaluations are reported in Table 2 below.

TABLE 2

|  | Example | Comparative Examples | |
|---|---|---|---|
|  | 2 | 4 | 5 |
| components | | | |
| amidepolyether-modified polysiloxane | 10 | | |
| amino-modified polysiloxane | | 10 | |
| dimethylpolysiloxane | | | 10 |
| stearic acid | 0.5 | 0.5 | 0.5 |
| cetyl alcohol | 1.5 | 1.5 | 1.5 |
| vaseline | 3 | 3 | 3 |
| lanolin alcohol | 2 | 2 | 2 |
| polyoxyethylene glycol (10) monooleate | 2 | 2 | 2 |
| propylene glycol | 3 | 3 | 3 |
| triethanolamine | 1 | 1 | 1 |
| water | 77 | 77 | 77 |
| evaluation results | | | |
| storage stability | A | D | C |
| antistaticity | A | B | C |
| softness | A | C | B |
| smoothness | A | C | B |
| oily feel | A | C | B |

Example 3

A surface modifier composition was prepared by mixing the following to homogeneity: 4 weight parts of the amidepolyether-modified polysiloxane, 4 weight parts stearyltrimethylammonium chloride, 3 weight parts cetyl alcohol, 5 weight parts propylene glycol, and 84 weight parts water. This composition was tested for its storage stability, antistaticity, and use sensation as a hair care product, and the results of these evaluations are reported in Table 3 below.

Comparative Example 6

A surface modifier composition was prepared as in Example 3, but in this example the amino-modified polysiloxane was used in place of the amidepolyether-modified polysiloxane in Example 3. The properties of this composition were evaluated as in Example 3, and these evaluation results are reported in Table 3 below.

Comparative Example 7

A surface modifier composition was prepared as in Example 3, but in this example the dimethylpolysiloxane was used in place of the amidepolyether-modified polysiloxane in Example 3. The properties of this composition were evaluated as in Example 3, and these evaluation results are reported in Table 3 below.

TABLE 3

|  | Example | Comparative Examples | |
|---|---|---|---|
|  | 3 | 6 | 7 |
| components | | | |
| amidepolyether-modified polysiloxane | 4 | | |
| amino-modified polysiloxane | | 4 | |
| dimethylpolysiloxane | | | 4 |
| stearyltrimethylammonium chloride | 4 | 4 | 4 |
| cetyl alcohol | 3 | 3 | 3 |
| propylene glycol | 5 | 5 | 5 |
| water | 84 | 84 | 84 |
| evaluation results | | | |
| storage stability | A | A | B |
| antistaticity | A | B | C |
| flexibility | A | C | B |
| smoothness | A | C | C |
| oily feel | A | B | C |
| raspiness when damp | A | B | C |

The composition according to the present invention provides an excellent surface feel, surface protection, surface lubricity, and antistaticity and does not deteriorate over long periods of time. It also exhibits an excellent blending stability with respect to cosmetics, lubricants, lustrants, antifoams, fiber-treatment agents, and paints, and as a consequence can improve various surface properties of these products.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A surface modifier composition comprising:

(A) an amidepolyether-modified organopolysiloxane having the formula:

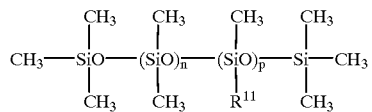

where $R^{11}$ is $-(CH_2)_3NHCO(CH_2)_qO(CH_2CH_2O)_r(CH_2)_sH$; n is 10–1,000, p is 1–100, q is 1–100, r is 2–20, and s is 0–20; and (B) an alcoholic functional group-containing compound as a stabilizer in which component (B) is an aliphatic alcohol having at least 10 carbon atoms.